United States Patent [19]

Kania et al.

[11] Patent Number: 5,802,601
[45] Date of Patent: Sep. 1, 1998

[54] INTERFACE BETWEEN A MEMORY HAVING A GIVEN NUMBER OF ADDRESS INPUTS AND A PROCESSOR HAVING FEWER ADDRESS OUTPUTS, AND PROCESSOR AND MEMORY EQUIPPED ACCORDINGLY

[75] Inventors: Bertrand Kania, Paris, France; Dieter Kopp, Hemmingen, Germany

[73] Assignee: Alcatel Business Systems, Paris, France

[21] Appl. No.: 561,415

[22] Filed: Nov. 21, 1995

[30] Foreign Application Priority Data

Nov. 24, 1994 [FR] France .................... 94 14101

[51] Int. Cl.$^6$ .................. G06F 9/02; G06F 12/02
[52] U.S. Cl. .................. 711/200; 711/2; 711/6; 711/1; 711/210; 711/211
[58] Field of Search .................. 395/410, 402, 395/421.01, 421.02, 309, 311, 406, 401

[56] References Cited

U.S. PATENT DOCUMENTS 5,255,382 10/1993 Pawloski .................. 395/402

OTHER PUBLICATIONS

Orlando, R. "EEPROMS ehance microcontroller–based system performance,", EDN Electrical Design News, vol. 35, No. 21, pp. 213–217, Oct. 1990.

Primary Examiner—David K. Moore
Assistant Examiner—Than V. Nguyen
Attorney, Agent, or Firm—Sughrue, Mion, Zinn, Macpeak & Seas, PLLC

[57] ABSTRACT

An interface between a memory that has "n" address bit inputs and a processor which has "p" address bit outputs (where p<n) and "q" programmable data bit outputs (where $q \geq n-p$). The interface includes a logic circuit connected to a byte select bit output, to a memory read-write command bit output and to an appropriately programmed one of the "q" programmable bit outputs of the processor. The logic circuit produces a least significant bit address bit input AI0 defined by the equation AI0=R/W & byte-s OR $\overline{R/W}$ & I/O0. The interface connects the remaining "p" address bit inputs of the memory succeeding to the "p" address bit outputs of the processor, in order, and connects the remaining "n–p–1" most significant address bit inputs of the memory to the same number of appropriately programmed programmable bit outputs of the processor.

9 Claims, 3 Drawing Sheets

1

INTERFACE BETWEEN A MEMORY HAVING A GIVEN NUMBER OF ADDRESS INPUTS AND A PROCESSOR HAVING FEWER ADDRESS OUTPUTS, AND PROCESSOR AND MEMORY EQUIPPED ACCORDINGLY

BACKGROUND OF THE INVENTION

1. Field of the Invention

The invention concerns an interface between a data memory having a given number of address bit inputs and a processor having a smaller number of address bit outputs and programmable bit outputs at least some of which can be used to complete the addresses. It also concerns processors and memories equipped with an interface of this kind.

2. Description of the Prior Art

Processors, including signal processors, have input/output ports organized in a standardized manner to enable them to communicate with random access memory (RAM) or read-only memory (ROM). These memories and these processors are usually interconnected by data buses conveying eight or 16 bits in parallel, for example, and external memory addressing buses with "p" lines, where "p" is equal to 16, for example. Electrically writable and erasable read-only memories (FLASH EEPROM) have "n" address bit inputs where "n" is greater than the number "p" of external memory address bit outputs of some available processors, in particular some signal processors. This occurs if FLASH EEPROM having 19 address bit inputs are used in conjunction with a signal processor normally supplying an address signal on only 16 bits, i.e. via 16 outputs.

FLASH EEPROM have the advantage of being electrically erasable, like RAM, and of retaining the data stored in them even if the power supply is disconnected, like ROM and unlike RAM with no back-up power supply. There are therefore applications in which the use of FLASH EEPROM for non-volatile temporary storage protected against data loss is considered, especially as these memories are made in the form of modular circuits providing a high storage capacity. In telecommunications applications, for example, it is useful to be able to store digital information conventionally structured as bytes for a particular time with no risk of loss of data due so absence of electrical power supply during storage. One feasible application of these memories is to store voice messages in personal or shared telephone answering devices.

However, FLASH EEPROM with sufficiently large capacities, for example a capacity of 512 kbytes, demand extensive addressing capabilities of the processors controlling them, the various bytes in the memories that can be erased in blocks of predetermined size being individually addressable to write them and to read them.

Although processors can normally address memory capacities of this magnitude, they are often not designed to address external memories having this much capacity and users are not usually able to modify the components of the processors to obtain the required addressing capabilities.

SUMMARY OF THE INVENTION

The invention consists in an interface between a memory that stores data in the form of bytes and has "n" address bit inputs for addressing each byte by means of a characteristic combination of "n" bits and a processor which has "p" address bit outputs where "p" is less than "n" and "q" programmable data bit outputs where "q" is at least equal to "n–p", the interface including a binary logic circuit connected to a byte select bit output, to a memory read-write command bit output and to an appropriately programmed one of the "q" programmable bit outputs of the processor and adapted to produce a bit AI0 sent to the least significant address bit input of the memory and defined by the equation $AI0 = R/W \ \& \ \overline{byte\text{-}s} \ OR \ \overline{R/W} \ \& \ \overline{I/O0}$, connecting the "p" address bit inputs of the memory succeeding, in increasing order of weight, the least significant address bit input to the "p" address, bit outputs of the processor, in the same order, and connecting the remaining "n–p–1" most significant address bit inputs of the memory to the same number of appropriately programmed programmable bit outputs of said processor.

According to one feature of the invention, said binary logic circuit is further connected to a strobe bit output of the processor and generates a write command bit $\overline{WR}$ defined by the equation $\overline{WR} = \overline{strb} \ \& \ R/W \ \& \ \overline{byte\text{-}s}$ and an output enable bit $\overline{OE}$ defined by the equation $\overline{OE} = \overline{strb} \ \& \ \overline{R/W}$ for the corresponding inputs of the memory.

The invention further proposes a memory comprising at least two identical units in parallel each of which has "n" bit address inputs, a write-read command bit input, an output enable bit input; and a chip enable bit input, wherein said logic circuit is connected in parallel to the least significant bit, write bit and output enable bit inputs of each unit, the chip enable input specific to each unit being connected to a programmable bit output of the processor which differs in each unit and is programmed accordingly.

The invention further proposes a processor and a memory each including an interface as defined hereinabove.

The invention, its features and its advantages are explained in the following description with reference to the appended drawing.

DETAILED DESCRIPTION OF THE PREFERRED EMBODIMENT

Figure 1:
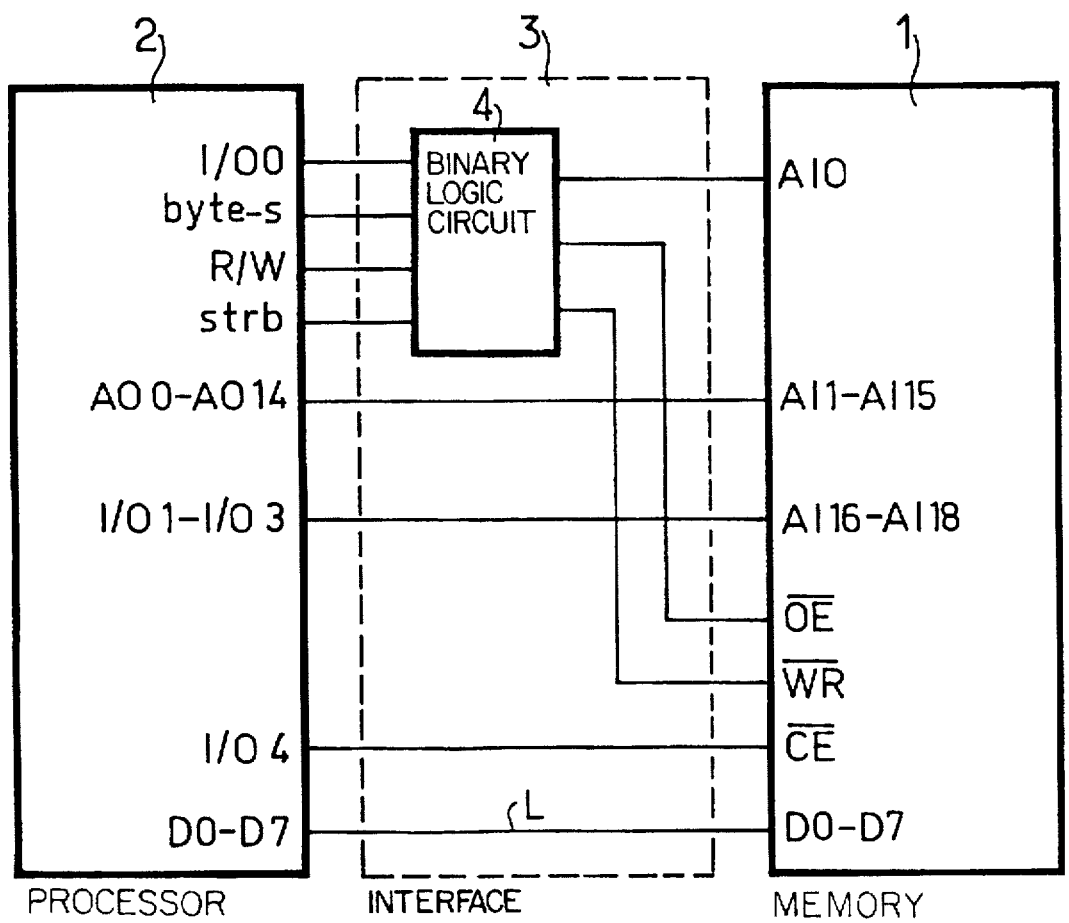
FIG. 1 is a block schematic of a processor/memory interface, the memory having a greater number of address inputs than the number of address outputs of the processor.

The arrangement shown in FIG. 1 is intended to enable a memory 1 to be controlled from a processor 2 when the memory 1 stores data organized into bytes and has "n" bit inputs for addressing each byte by means of a characteristic combination of "n" bits when the number "n" is greater than the number "p" of address bit outputs of the processor. Programmable bit outputs of the processor are therefore used to address the memory, assuming that the number "q" of programmable bit outputs available on the processor is at least equal to "n–p".

In one embodiment, the memory 1 has 19 address bit inputs "AI0" through "AI18" (i.e. n=19) and the processor 2 is a signal processor which has a standard random access memory (RAM) or read-only memory (ROM) port. In the manner known in itself, the processor 1 has a timebase (not shown) supplying the clock signals it needs to operate.

The standard input/output port has 15 address bit outputs "AO0" through "AO14" for the address signal (i.e. p=15). It also has five inputs-outputs "I/O1" through "I/O4" used as programmable bit outputs, a read-write command bit output "R/W", a byte select command bit output "byte-s" and a strobe bit output "strb".

The processor 2 and the memory 1 are interconnected by an interface 3 which includes a binary logic circuit 4 and a number of links including a link "L" for transferring data byte by byte between the memory and the processor in both directions, the link "L" comprising eight parallel lines "D0" through "D7", for example.

Figure 2:
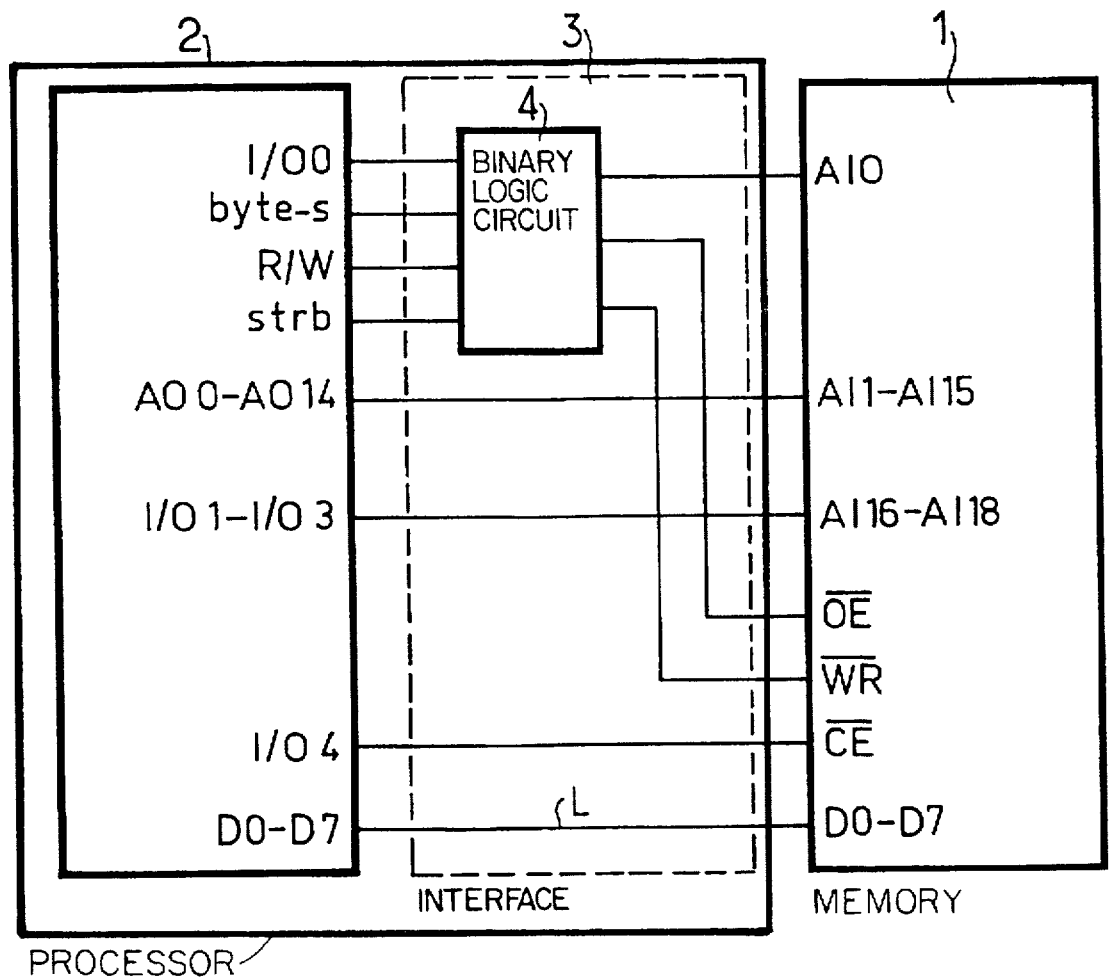
FIG. 2 is a block schematic of an alternative arrangement where the interface is included within the processor.
Figure 3:
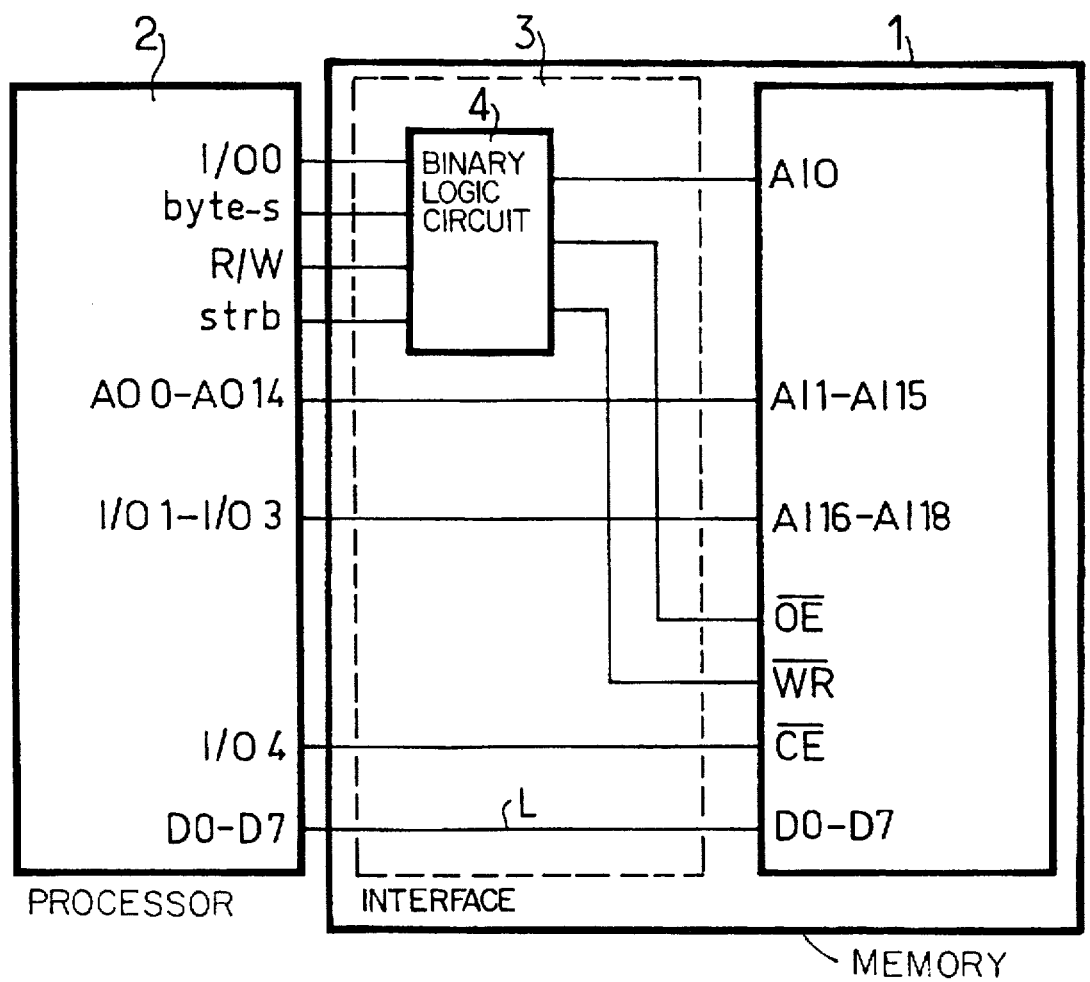
FIG. 3 is a block schematic of an alternative arrangement where the interface is included within the memory.

The interface 3 is connected between the memory 1 and the processor 2 as an intermediary device in the example shown in FIG. 1. Alternatively, the interface may be included within the processor 2 as shown in FIG. 2, or inside the memory 1 as illustrated in FIG. 3.

In the embodiment shown in FIG. 1, a first: address input "AI0" of the memory 1 is connected to the output of the logic circuit 3 and the "p"=15 other address bit inputs "AI1" through "AI15" of the memory 1 are connected to the "p"=15 address bit outputs "AO0" through "AO14" of the processor 2. The remaining three address bit inputs "AI16" through "AI18" of the memory 1 are connected to the three input-outputs "I/O1" through "I/O3" of the processor 2 used as programmable bit outputs, a conventional repetitive program being used to enable them to operate as address bit outputs.

The logic circuit 3 is connected to the input-output "I/O0", to the byte select command bit output "byte-s", to the strobe bit output "strb" and to the read/write command signal output "R/W" of the processor 2. The interface 3 is adapted to command the least significant address bit input AI0 of the memory 1, the value of the bit applied to this input being defined by the equation: AI0=R/W & $\overline{\text{byte-s}}$ OR $\overline{\text{R/W}}$ & I/O0.

The read-write command "R/W" is conventionally binary "0" in a write phase and binary "1" in a read phase.

The byte select command output "byte-s" is provided on signal processors adapted to enable writing and reading of a 16-bit word in a byte-oriented memory, by means of two successive byte access cycles to the memory, the command bit being at binary "0" for a first byte and then at binary "1" for the next byte.

The byte select command is used here since data is transferred in bytes between the memory 1 and the processor 2. Two bytes forming a 16-bit word and regarded as a less significant byte and a more significant byte can therefore be addressed in succession by appropriately programming the processor.

Each byte location in the memory 1 can therefore be addressed by the processor 2 using the combination of a least significant bit obtained from the equation AI0 defined above, the address bits supplied by the address bit outputs AO0 through AO14 and three most significant address bits from the programmable bit outputs, here the inputs-outputs I/O1 through I/O3 programmed accordingly.

The logic circuit 4 controls a write command bit input "$\overline{\text{WR}}$" of the memory 2 on the basis of the signals supplied by the memory read-write command bit output "R/W", the byte select bit output "byte-s" and the strobe bit output "strb" of the processor 1 to which this logic circuit is connected, the command bit $\overline{\text{WR}}$ being defined by the equation $\overline{\text{WR}}$=strb & $\overline{\text{R/W}}$ & $\overline{\text{byte-s}}$.

The strobe bit output "strb" of the processor 2 produces a pulse corresponding to binary "0" for each byte.

The logic circuit 4 also controls an output enable bit input "$\overline{\text{OE}}$" of the memory 1 in accordance with signals supplied by the memory read-write command bit output and the strobe bit output "strb" of the processor 1 to which it is connected, the output enable bit being defined by the equation $\overline{\text{OE}}$=strb & R/W.

A chip enable bit input "$\overline{\text{CE}}$" of the memory 1 is controlled by an input-output I/O4 of the processor 2 used as a programmable bit output, the processor being programmed to allow use of the memory when necessary.

Consequently, the processor 2 is involved in write phase byte addressing operations through the intermediary of its input-output "I/O0" used as a programmable bit output and programmed as indicated above to command the address bit input "AI0" of the memory for each byte. The write command bit $\overline{\text{WR}}$ results in a pulse that corresponds to one or other of the successive binary "0" bits produced by the strobe bit output "strb" of the processor, according to the level of the bit at the byte select bit output "byte-s".

The processor 2 is involved in read phase byte addressing operations through the intermediary of its byte select output "byte-s" which selects two successive bytes considered as a less significant byte and a more significant byte by the processor. The read command input of the memory is essentially controlled by the strobe bit output "strb" of the processor.

It is possible to command a plurality of parallel-connected memory units identical to the memory 1 described above by assigning a different input-output of the processor to each unit constituting the memory to command the respective chip enable bit inputs of those units, e.g., as shown in FIG. 2. The bit address inputs of the memory units are then connected in parallel either to the output of the logic circuit 3, in the case of ihat receiving the least significant address bit, or to the bit address outputs of the processor, in the same way as a single memory 1. Likewise for the write-read command bit "$\overline{\text{WR}}$" and output enable bit "$\overline{\text{OE}}$" inputs and data inputs-outputs "D0" through "D7" by means of which data bytes are exchanged with the processor. The latter can therefore select the memory unit to be addressed by activating its own input-output connected to the chip enable bit input "$\overline{\text{CE}}$" of that unit, addressing, writing and reading being exactly the same for all units.

There is claimed:

1. An interface between a memory that stores data in the form of bytes and has "n" address bit inputs for addressing each byte by means of a characteristic combination of "n" bits, and a processor which has "p" address bit outputs, where "p" is less than "n", and "q" programmable data bit outputs, where "q" is at least equal to "n–p", the interface including a binary logic circuit connected to a byte select bit output, to a memory read-write command bit output and to an appropriately programmed one of the "q" programmable bit outputs of the processor and adapted to produce a bit AI0 sent to the least significant address bit input of the memory and defined by the equation AI0=R/W & $\overline{\text{byte-s}}$ OR $\overline{\text{R/W}}$ & I/O0, said interface connecting the "p" address bit outputs of the processor to the "p" next least significant address bit inputs of the memory following said least significant address bit input, and connecting the remaining "n–p–1" most significant address bit inputs of the memory to the same number of appropriately programmed programmable bit outputs of said processor.

2. An interface according to claim 1 wherein said binary logic circuit is further connected to a strobe bit output of the processor and generates a write command bit $\overline{\text{WR}}$ defined by the equation $\overline{\text{W/R}}$=strb & $\overline{\text{R/W}}$ & $\overline{\text{byte-s}}$ and an output enable bit $\overline{\text{OE}}$ defined by the equation $\overline{\text{OE}}$=strb & R/W for the corresponding inputs of the memory.

3. An interface according to claim 2 for a memory comprising at least two memory units in parallel each of which has "n" bit address inputs, a write-read command bit input, an output enable bit input and a chip enable bit input, wherein said logic circuit is connected in parallel to the least significant bit, write-read command bit and output enable bit inputs of each unit, said chip enable input specific to each unit being connected to a programmable bit output of said processor which differs in each unit and is programmed accordingly.

4. A processor including an interface between a memory that stores data in the form of bytes and has "n" address bit inputs for addressing each byte by means of a characteristic combination of "n" bits, and a processor which has "p" address bit outputs, where "p" is less than "n", and "q" programmable data bit outputs, where "q" is at least equal to "n-p", the interface including a binary logic circuit connected to a byte select bit output, to a memory read-write command bit output and to an appropriately programmed one of the "q" programmable bit outputs of the processor and adapted to produce a bit AI0 sent to the least significant address bit input of the memory and defined by the equation AI0=R/W & $\overline{\text{byte-s}}$ OR $\overline{\text{RW}}$ & $\overline{\text{I/O0}}$, said interface connecting the "p" address bit outputs of the processor to the "p" next least significant address bit inputs of the memory following said least significant address bit input, and connecting the remaining "n-p-1" most significant address bit inputs of the memory to the same number of appropriately programmed programmable bit outputs of said processor.

5. A processor according to claim 4 wherein said binary logic circuit is further connected to a strobe bit output of the processor and generates a write command bit $\overline{\text{WR}}$ defined by the equation $\overline{\text{W/R}}$=strb & $\overline{\text{R/W}}$ & $\overline{\text{byte-s}}$ and an output enable bit $\overline{\text{OE}}$ defined by the equation $\overline{\text{OE}}$=$\overline{\text{strb}}$ & R/W for the corresponding inputs of the memory.

6. A processor according to claim 5 for a memory comprising at least two memory units in parallel each of which has "n" bit address inputs, a write-read command bit input, an output enable bit input and a chip enable bit input, wherein said logic circuit is connected in parallel to the least significant bit, write-read command bit and output enable bit inputs of each unit, said chip enable input specific to each unit being connected to a programmable bit output of said processor which differs in each unit and is programmed accordingly.

7. A memory including an interface between a memory that stores data in the form of bytes and has "n" address bit inputs for addressing each byte by means of a characteristic combination of "n" bits, and a processor which has "p" address bit outputs, where "p" is less than "n", and "q" programmable data bit outputs, where "q" is at least equal to "n-p", the interface including a binary logic circuit connected to a byte select bit output, to a memory read-write command bit output and to an appropriately programmed one of the "q" programmable bit outputs of the processor and adapted to produce a bit AI0 sent to the least significant address bit input of the memory and defined by the equation AI0=R/W & $\overline{\text{byte-s}}$ OR $\overline{\text{R/W}}$ & $\overline{\text{I/O0}}$, said interface connecting the "p" address bit outputs of the processor to the "p" next least significant address bit inputs of the memory following said least significant address bit input, and connecting the remaining "n-p-1" most significant address bit inputs of the memory to the same number of appropriately programmed programmable bit outputs of said processor.

8. A memory according to claim 7 wherein said binary logic circuit is further connected to a strobe bit output of the processor and generates a write command bit $\overline{\text{WR}}$ defined by the equation $\overline{\text{W/R}}$=strb & $\overline{\text{R/W}}$ & $\overline{\text{byte-s}}$ and an output enable bit $\overline{\text{OE}}$ defined by the equation $\overline{\text{OE}}$=$\overline{\text{strb}}$ & R/W for the corresponding inputs of the memory.

9. A memory according to claim 8 for a memory comprising at least two memory units in parallel each of which has "n" bit address inputs, a write-read command bit input, an output enable bit input and a chip enable bit input, wherein said logic circuit is connected in parallel to the least significant bit, write-read command bit and output enable bit inputs of each unit, said chip enable input specific to each unit being connected to a programmable bit output of said processor which differs in each unit and is programmed accordingly.

* * * * *